(12) United States Patent
Mizuno et al.

(10) Patent No.: US 6,539,275 B1
(45) Date of Patent: Mar. 25, 2003

(54) MACHINE CONTROLLER AND PROCESS WITH TWO-STEP INTERPOLATION

(75) Inventors: Toru Mizuno, Tokyo (JP); Toshiaki Otsuki, Tokyo (JP); Shoichi Sagara, Yamanashi (JP); Yasuhiro Saitou, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/321,229

(22) Filed: May 27, 1999

(30) Foreign Application Priority Data

May 28, 1998 (JP) ............................................. 10-164297

(51) Int. Cl.[7] .......................................... G05B 19/416
(52) U.S. Cl. ....................... 700/170; 700/159; 700/69; 700/252
(58) Field of Search ..................... 700/159, 69, 252, 700/170; 318/600, 603, 569

(56) References Cited

U.S. PATENT DOCUMENTS

| | | | | |
|---|---|---|---|---|
| 5,005,135 A | * | 4/1991 | Morser et al. | 318/571 |
| 5,218,281 A | * | 6/1993 | Sasaki et al. | 318/573 |
| 5,221,884 A | * | 6/1993 | Teshima | 318/567 |
| 5,309,074 A | * | 5/1994 | Mizukami | 318/571 |
| 5,416,394 A | * | 5/1995 | Lee | 318/560 |
| 5,485,069 A | * | 1/1996 | Otsuki et al. | 318/570 |

FOREIGN PATENT DOCUMENTS

| | | |
|---|---|---|
| EP | 0439617 A1 | 8/1991 |
| EP | 05073128 | 3/1993 |
| EP | 0706104 A1 | 4/1996 |
| EP | 0780745 A1 | 6/1997 |
| JP | 61-168019 | 7/1986 |
| JP | 62-28810 | 2/1987 |
| JP | 3-78006 | 4/1991 |
| JP | 4-33012 | 2/1992 |
| JP | 4-140802 | 5/1992 |
| JP | 6-274220 | 9/1994 |
| JP | 8-202425 | 8/1996 |
| JP | 9-305211 | 11/1997 |
| JP | 11-149306 | 6/1999 |

\* cited by examiner

*Primary Examiner*—Leo Picard
*Assistant Examiner*—Michael D. Masinick
(74) *Attorney, Agent, or Firm*—Staas & Halsey LLP

(57) ABSTRACT

A controller for a machine capable of performing acceleration/deceleration control to which an optimal tangential acceleration within an allowable maximum acceleration for each axis is applied. A first interpolation section receives data obtained by analysis of a program by a command analysis section, an makes interpolating calculation in every first sampling period to output it into an intermediate memory. A tangential acceleration calculating section determines a tangential acceleration based on each segment and the allowable maximum acceleration for each axis to output it into the intermediate memory. A deceleration target velocity calculating section prepares an acceleration/deceleration pattern for a plurality of segments stored in the intermediate memory, to output it to the intermediate memory. An acceleration/deceleration control section performs acceleration/deceleration control based on the data in the intermediate memory so that the tangential velocity at an end point of each segment is not higher than the deceleration target velocity, and calculates velocity for each second sampling period. A second interpolation section defines a smooth curve based on the output from the acceleration/deceleration control section and the data taken out from the intermediate memory, and outputs a point on the smooth curve for each second sampling period.

7 Claims, 10 Drawing Sheets

ALLOWABLE
ACCELERATION : X AXIS   1000mm/s$^2$
              Y AXIS    500mm/s$^2$

PROGRAM      : N1G01G91X100.0F6000   : MOVEMENT IN X-AXIS DIRECTION
              N2Y100.0               : MOVEMENT IN X-AXIS DIRECTION

MACHINE CONTROLLER AND PROCESS WITH TWO-STEP INTERPOLATION

BACKGROUND OF THE INVENTION

1. Field of the Invention

The present invention relates to a controller for controlling a machine, such as a general machine tool, a laser beam machine, and a plasma jet machine, in which axes thereof are driven by servomotors. More particularly, the present invention relates to a technology for enhancing machining accuracy and machining speed of a machine controlled by the controller.

2. Description of Related Art

On various types of machines such as laser beam machines and plasma jet machines, various kinds of machining tool (for example, cutting tools, drilling tools, laser beam tools, and plasma torches) are mounted on their machining heads, and axes for moving the machining head or a work table relatively to each other are driven by servomotors.

The control of the servomotor for each axis is carried out by a servo control section (including a servo CPU, a servo amplifier, etc.) provided for each axis. The servo control section controls the servomotor based on a motion command outputted to each axis from a controller of a motor machine and a position feedback signal and a speed feedback signal from a pulse encoder provided on the servomotor or a driving shaft.

The controller reads a program defining a motion path of the machining tool, performs an interpolation process and determines a number of interpolation points along the motion path by software processing. Also, an acceleration/deceleration process is carried out so that a motion command for specifying a smooth velocity change with an acceleration (positive or negative, the same in the following description) of a predetermined limit is outputted to the servo control section.

The acceleration/deceleration process is often carried out such that the acceleration/deceleration is effected on each axis based on the data after the interpolation process. However, in such acceleration/deceleration after interpolation, a path error may occur because of a lag of the acceleration/deceleration. Therefore, so as to prevent the occurrence of path error due to the lag of the acceleration/deceleration, an acceleration/deceleration before interpolation in which acceleration/deceleration process is performed prior to the interpolation process may be adopted.

The acceleration in the acceleration/deceleration before interpolation means an acceleration along a direction of motion (tangential direction of the motion path) in the space. However, in the acceleration/deceleration before interpolation which has been conventionally adopted, an allowable acceleration actually specified in the acceleration/deceleration process is set to be constant, irrespective of the motion direction (tangential direction of the motion path) in the space. Therefore, with respect to a machine having a plurality of axes whose acceleration/deceleration characteristics are greatly different from one another, it is necessary to select an acceleration (tangential acceleration) matching the axis having the lowest allowable acceleration. As a result, in the actual motion, there is a possibility that the acceleration/deceleration is effected while leaving acceleration margin for each axis, so that there arises a problem that the time taken for the acceleration/deceleration unnecessarily increases.

Also, with respect to a machine in which allowable accelerations of all axes can be regarded as equal, the tangential acceleration can be made higher than the allowable acceleration of each axis by the simultaneous interpolation of the plurality of axes. In this case, however, the tendency of increasing the time taken for the acceleration/deceleration remains because a constant acceleration is specified.

To solve the above problem, Japanese Patent Laid-Open Publication No. 3-78006 has proposed a method in which an optimal tangential acceleration is determined from the allowable acceleration of each axis and the motion amount for each axis contained in block information of the program. However, this method is effective for a motion by a linear interpolation such that acceleration/deceleration completes in one block, but it can not be applied to a case in which a direction of the motion changes momently, such as a circular interpolation.

For a procedure of the interpolation and the acceleration/deceleration, a method (two-stage interpolation) has been proposed in which the interpolation is divided into a first interpolation (former stage) and a second interpolation (latter stage), and the acceleration process is executed in the second interpolation of latter stage. Of the methods of the two-stage interpolation, the method proposed by the inventors (see Japanese Patent Application No. 9-329744) is especially advantageous in keeping a high path accuracy because smoothness is secured in the second interpolation.

However, even in the technology proposed in Japanese Patent Application No. 9-329744, the acceleration for the acceleration/deceleration control can not be optimized in accordance with the motion direction at every moment. However, as described later, the technology proposed in Japanese Patent Application No. 9-329744 is a basic technology of the present invention.

SUMMARY OF THE INVENTION

An object of the present invention is to provide a controller for a machine such as a general machine tool, a laser beam machine and a plasma jet machine, which is capable of performing an acceleration/deceleration control in which an optimal tangential acceleration is applied within an allowable maximum acceleration set for each axis in acceleration/deceleration, while fully taking advantage of the acceleration capacity of each axis. Further object of the present invention is to enable such acceleration/deceleration control to be applied to a case where a direction of motion changes at every moment.

From another point of view, still another object of the present invention is to enable an acceleration in the acceleration/deceleration control to be optimized under the condition of the motion direction at every moment by improving the technology proposed by the inventors in Japanese Patent Application No. 9-329744.

In the present invention, an improvement is made on the controller for a machine (proposed in Japanese Patent Application No. 9-329744) which performs a two-stage interpolation for securing smoothness in path segments in a second interpolation, a motion direction (tangential direction in the space) is determined from data outputted by a first interpolation process, an optimal tangential acceleration, which does not exceed the allowable maximum acceleration set for each axis in acceleration/deceleration, is calculated based on the motion direction, and a tangential acceleration/deceleration process is performed in the second interpolation based on the determined optimal tangential acceleration.

So as to control a machine having axes driven by servomotors, the present invention is applicable to a controller for a machine having means for performing interpolation process on a motion path of a tool commanded by a program through two stages of a first interpolation and a second interpolation based on an output of the first interpolation.

According to the present invention, the optimal tangential acceleration is calculated based on an allowable maximum acceleration set for each axis in acceleration/deceleration and a motion direction of a tool determined based on segment data included in output data of first interpolation means, and a tangential acceleration/deceleration is effected based on the optimal tangential acceleration.

In the preferred embodiment, the controller comprises a target velocity calculating means for determining a target velocity at an end point of each segment based on data outputted from the first interpolating means and stored in an intermediate memory, and the acceleration/deceleration control means performs acceleration/deceleration control based on the target velocity.

Also, in a typical embodiment, the target velocity calculating means repeatedly executes the following processes (a) through (d) until it is determined in the process (d) that the motion segment i–1 is subjected to the second interpolation:

(a) assigning an index i to indicate a newest motion segment outputted from the first interpolation means and setting a velocity at an end point of the motion segment i to zero;

(b) calculating a velocity at a start point of the motion segment i so as to reach the velocity at an end point of the motion segment i based on the optimal tangential acceleration calculated by the acceleration calculating means;

(c) setting the velocity at the start point as a velocity of an end point of a motion segment i–1 which is immediately before the motion segment i; and (d) determining whether or not the motion segment i–1 is subjected to the second interpolation and decreasing the index i by one to proceed to the process (b) if it is determined that the motion segment i–1 is subjected to the second interpolation.

The velocity at a start point calculated at the process (b) may be adjusted to be reduced in compliance with conditions such as corner deceleration and commanded speed.

In the present invention, the data outputted from the first interpolating means includes data (hereinafter, referred simply to as "segment") representing a motion amount of one interpolation period for each axis. This can be regarded as a state equivalent to a state in which minute straight blocks corresponding to these segments are commanded continuously. Therefore, all interpolations such as circular interpolation and linear interpolation can be handled in the same way. Specifically, even when the motion direction changes continuously, such as in the circular interpolation, the optimal acceleration is calculated for each segment included in the data outputted from the first interpolating means, thereby the tangential acceleration can be changed continuously.

DETAILED DESCRIPTION OF THE PREFERRED EMBODIMENTS

Figure 1:
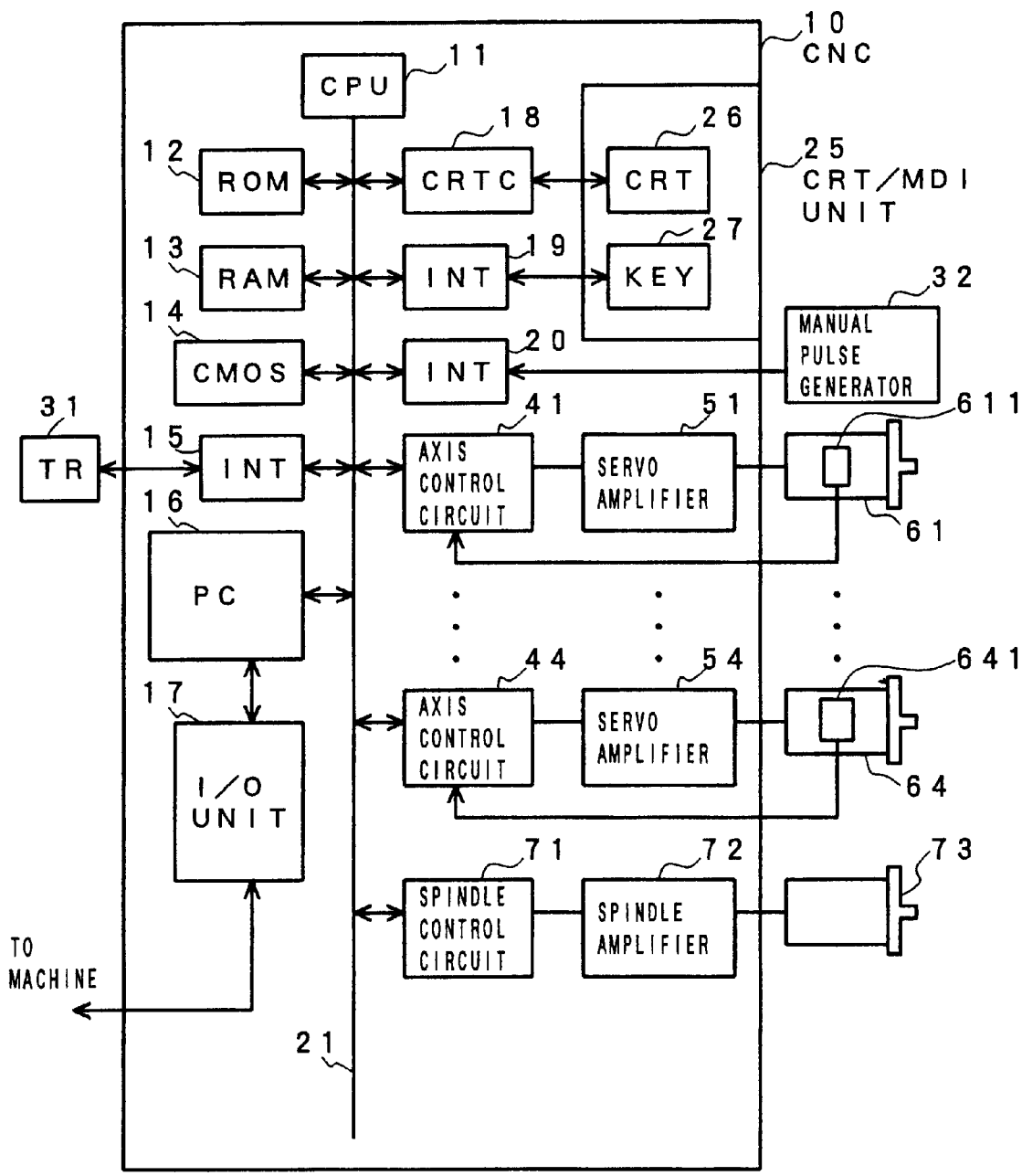
FIG. 1 is a block diagram of a principal portion showing a hardware configuration of a controller for a machine to which the present invention is applied.

FIG. 1 is a block diagram of a principal portion typically showing a hardware constitution of a controller for a machine to which the present invention is applied. In FIG. 1, a controller denoted by reference numeral 10 has a processor 11 for collectively controlling the whole system. The processor 11 reads a system program stored in a ROM 12 via a bus 21, and executes the control of the whole of the controller 10. A RAM 13 in the form of DRAM, for example, temporarily stores calculation data, display data, etc.

A CMOS 14 stores a machining program and various parameters. Further, the data stored in the CMOS 14 includes software (program and related parameters) for executing a two-stage interpolation and an acceleration/deceleration process in combination in the later-described mode peculiar to the present invention.

The CMOS 14 is backed up by a battery (not shown) to function as a nonvolatile memory in which data is not erased even if the power source of the controller 10 is turned off.

An interface 15 is connected with an external device 31 such as a off-line programming device and a printer so as to perform input/output with the external device. When a machining program is prepared by using the off-line programming device, data of the machining program are read by the controller 10 via the interface 15. The data of the machining program edited by the controller 10 can be outputted through the printer.

A PC (programmable controller) 16, which is incorporated in the controller 10, controls the machine by means of a sequence program prepared in a ladder form. Specifically, the PC 16 converts data into signals necessary for the sequence program in accordance with M function, S function and T function specified by the machining program, and sends out them to the machine side (here, the aforementioned machine having four axes of X axis, Y axis, Z axis and A axis) through an I/O unit 17. These output signals operate various operation parts (air cylinder, screw, electric actuator, etc.) on the machine. Also, the PC 16 receives signals from various switches on the machine and a machine control panel, performs necessary processing on them and sends them to the processor 11.

A graphic control circuit 18 converts digital data such as the present position of each axis (four axes), alarm, parameter and image data into an image signal, and outputs them. This image signal is sent to a display device 26 in a CRT/MDI unit, and is displayed on the display device 26. An interface 19 receives data from a keyboard 27 in the CRT/MDI unit 25, and sends them to the processor 11.

An interface 20, which is connected to a manual pulse generator 32, receives pulses from the manual pulse generator 32. The manual pulse generator 32 is mounted on the machine control panel and can be used for manual operation to move and position a movable part of the machine body including a work table.

Axis control circuits 41 to 44 receive a motion command for each axis from the processor 11, and issue it to the servo amplifiers 51 to 54. The servo amplifiers 51 to 54 drive servomotors 61 to 64 for each axis based on this motion command. The servomotors 61 to 64 for each axis drive basic three axes (X axis, Y axis and Z axis) and rotation axis (A axis) of the machine. Here, A axis is a rotation axis for adjusting the direction of the work table. The feature of the present invention is reflected in the operation of the basic three axes (X axis, Y axis and Z axis).

Reference numeral 641 denotes a pulse coder as a position detector attached to the servomotor 64 for driving A axis. Although not shown in the figure, the servomotors 61 to 64 for other axes are similarly provided with a pulse coder. The output pulse of the pulse coder is used to generate a position feedback signal and a speed feedback signal.

A spindle control circuit 71 receives a spindle rotation command, and sends out a spindle speed signal to a spindle amplifier 72. The spindle amplifier 72 receives the spindle speed signal, rotates a spindle motor 73 at a commanded rotational speed, and operates a machining tool of the machine. When the machine is a laser beam machine or a plasma jet machine, the configuration relating to the spindle is unnecessary, and instead of it, a well-known configuration for controlling a laser oscillator or a plasma torch is added.

Thus, the hardware constitution and its basic function of the controller used in the present invention may be the same as those incorporated in an ordinary numerical controller, not requiring a special change. Next, a method for executing two-stage interpolation and acceleration/deceleration in combination along the concept of the present invention by software processing in the controller having the above-described hardware configuration will be described in due order.

As described above, the controller in accordance with the present invention is premised on the technology proposed in Japanese Patent Application No. 9-329744 (hereinafter referred to as "basic technology" for convenience of explanation) and has been improved so as to be capable of optimizing the acceleration at the time of acceleration/deceleration. Therefore, for comparison, FIG. 2 shows a block diagram of software constitution for the two-stage interpolation method used in the basic technology.

Figure 2:
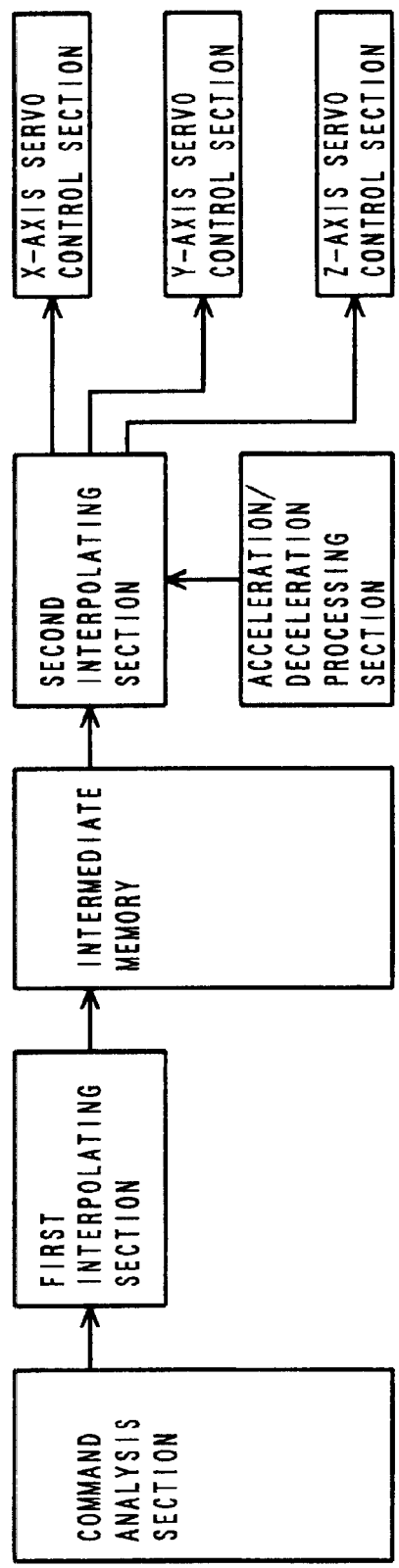
FIG. 2 is a functional block diagram of a two-stage interpolation method used in a basic technology of the present invention.

A command analysis section described at the leftmost portion in FIG. 2 analyzes a command program (program describing the path operation), and converts it into data for a first interpolation section. The first interpolation section computes and interpolates a point on the commanded path in every first sampling period, and outputs it into an intermediate memory. The main data stored in the intermediate memory are the motion amount of each axis (segment data), feed rate, block length, and the like.

An acceleration/deceleration control section carries out acceleration/deceleration control based on the data in the intermediate memory, computes the velocity for each second sampling period, and outputs it to a second interpolation section. The second interpolation section generates a smooth curve based on the output from the acceleration/deceleration control section and the data taken out from the intermediate memory, and outputs a point on the smooth curve for each second sampling period.

Figure 3:
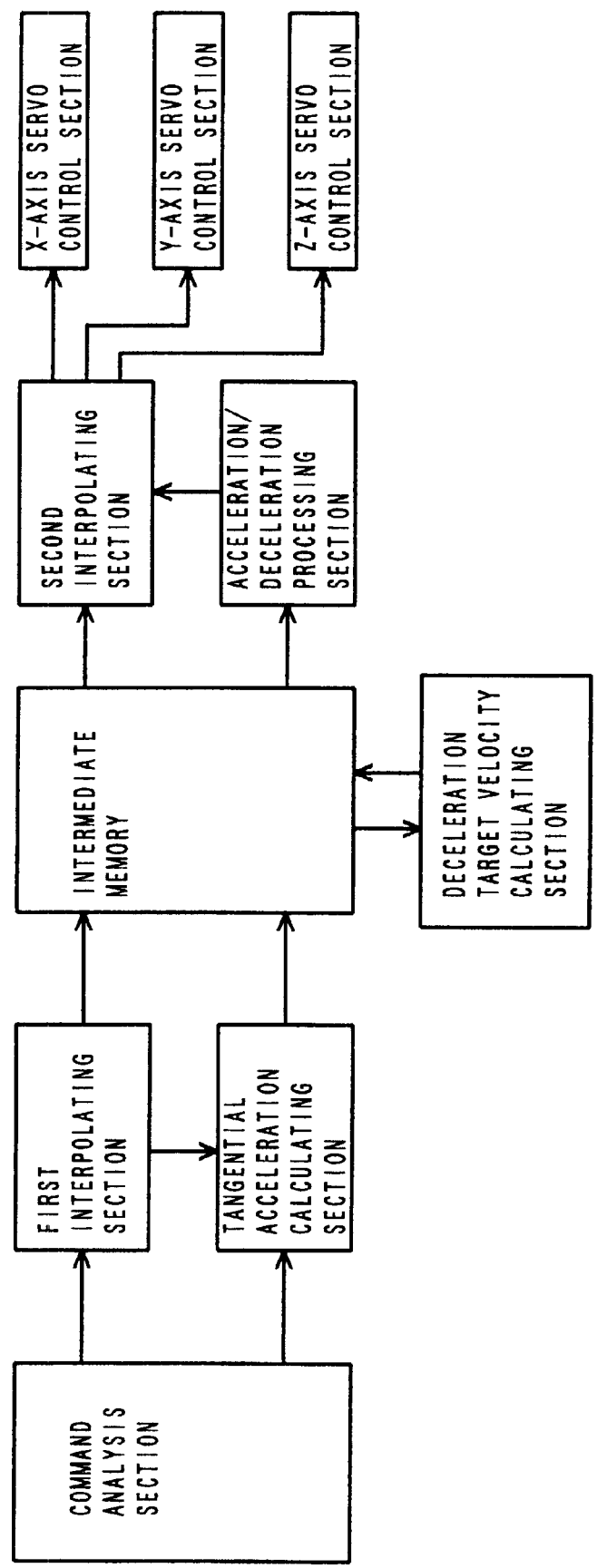
FIG. 3 is a functional block diagram of a two-stage interpolation method used in an embodiment.

The second sampling period is set shorter than the first sampling period. For example, the first sampling period is set at 8 ms, and the second sampling period is set at 1 ms. For the smooth interpolation performed in the second interpolation, various methods (for example, a motion segment group smoothly connected by a cubic curve is outputted) can be used. By contrast, a block diagram of software constitution for the two-stage interpolation method used in the controller of this embodiment is as shown in FIG. 3. As is apparent from the comparison with FIG. 2, this block diagram is featured by a tangential acceleration computing section for determining a tangential acceleration based on the first interpolation data and a deceleration target velocity computing section for determining a deceleration target velocity for each segment by preparing the optimal acceleration/deceleration pattern from the data in the intermediate memory.

A command analysis section described at the leftmost portion in FIG. 3 analyzes a command program, and converts it into data for a first interpolation section. The first interpolation section computes interpolates a point on the commanded path in a first sampling period, and outputs it into an intermediate memory. The tangential acceleration computing section determines tangential acceleration based on the motion amount of each segment and the allowable acceleration for each axis set by parameter etc. separately, and outputs it into the intermediate memory.

The deceleration target velocity computing section prepares an acceleration/deceleration pattern for a plurality of segments, computes the deceleration target velocity at the end point of each segment, and outputs it into the intermediate memory. An acceleration/deceleration control section carries out acceleration/deceleration control based on the data in the intermediate memory so that the tangential velocity at the end point of each segment is not higher than the deceleration target velocity, and computes the velocity for each second sampling period.

Further, the second interpolation section generates a smooth curve based on the output from the acceleration/deceleration control section and the data taken out from the intermediate memory, and outputs a point on the smooth curve for each second sampling period. Like the basic technology, the second sampling period is set shorter than the first sampling period. For example, the first sampling period is set at 8 ms, and the second sampling period is set at 1 ms. For the smooth interpolation performed in the second interpolation, a method in which a motion segment group smoothly connected by a cubic curve is outputted is described supplementally later.

Figure 4:
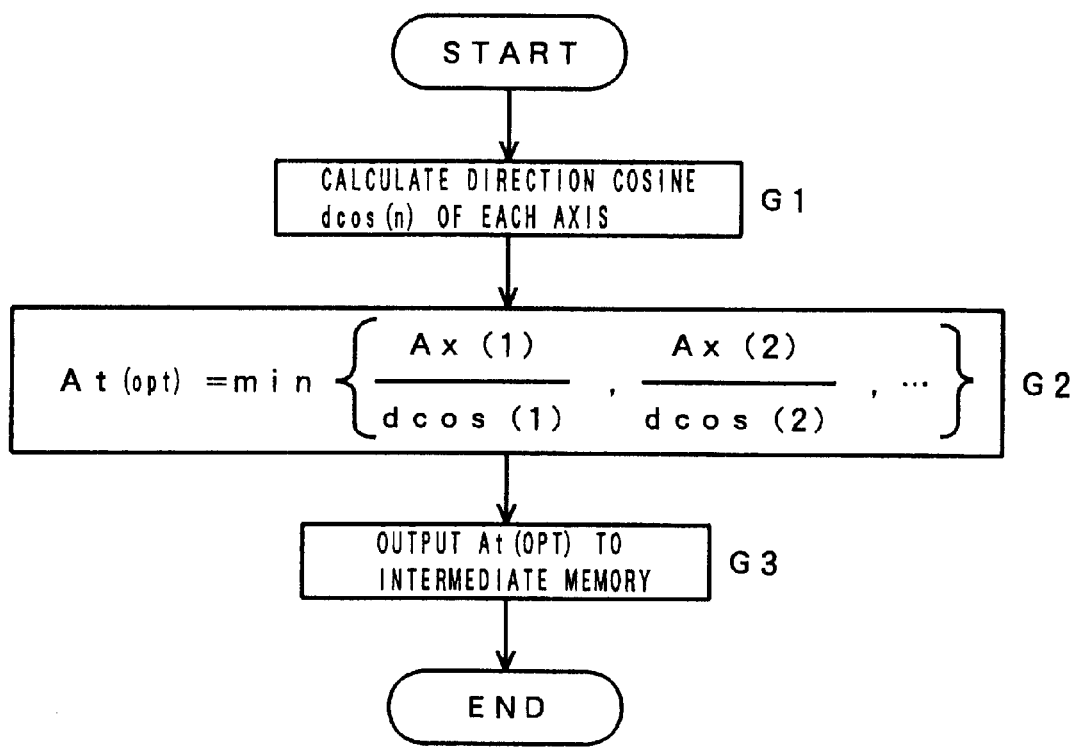
FIG. 4 is a flowchart showing a procedure for determining the optimal tangential acceleration from the motion amount data for each axis after a first interpolation and the allowable acceleration for each axis in a tangential acceleration computing section included in the functional block diagram of FIG. 3.

FIG. 4 is a flowchart showing a procedure for determining the optimal tangential acceleration from the motion amount data for each axis after a first interpolation and the allowable acceleration for each axis in a tangential acceleration computing section included in the functional block diagram of FIG. 3. The following is a description of a procedure for determining the optimal tangential acceleration in accordance with this flowchart.

In Step G1 in FIG. 4, a direction cosine d cos (n) for each axis is determined from the motion amount of each axis (one segment for each axis) of the first interpolation data. Here, n denotes the axis number. In the case where X axis, Y axis, and Z axis are controlled as shown in FIG. 3, for example, 1, 2 and 3 of "n" are respectively correspond to X axis, Y axis, and Z axis. In this case, a direction cosine d cos (1) is a cosine of an angle between a motion direction vector composed (vector composition) by each one segment for each axis and the first axis (X axis).

Similarly, direction cosines d cos (2) and d cos (3) are cosines of angles between a motion direction vector composed (vector composition) by each one segment for each axis between the second axis (Y axis) and the third axis (Z axis), respectively.

An acceleration At in the motion direction (that is, tangential acceleration) expressed by the aforesaid direction vector has to satisfy the following condition for all designated axes.

$$At \times d \cos(n) \leq Ax(n)$$

where, Ax(n) is the allowable maximum acceleration of the n-th axis.

In the above example, $$At \times d \cos(1) \leq Ax(1)$$

$$At \times d \cos(2) \leq Ax(2)$$

$$At \times d \cos(3) \leq Ax(3)$$

In Step G2, the optimal tangential acceleration At (opt) is determined by using the result of Step G1. At (opt) is computed as the largest value which satisfies the above condition. That is, the smallest one of Ax (n)/d cos (n) [n=1, 2 . . . , N: N is the total number of the designated axes] has to be found.

In the next Step G3, the aforesaid At (opt) is outputted to the intermediate memory, thereby finishing the process.

Thus, in the intermediate memory, in addition to the ordinary data outputted from the first interpolation section (including a segment expressing the motion amount of each axis for one interpolation period), the aforesaid At(opt) is inputted for each interpolation period of the first interpolation. It is to be noted that generally, At (opt) is not a constant, but changes depending on the interpolation output data from the first interpolation section.

The data transferred to the intermediate memory are used for the processing of deceleration target velocity computation performed in the deceleration target velocity computing section. This deceleration target velocity computation is performed for "acceleration/deceleration for a plurality of segments". An example shown in FIG. 5 is referred to, for explanation of the "acceleration/deceleration for a plurality of segments".

Figure 5:
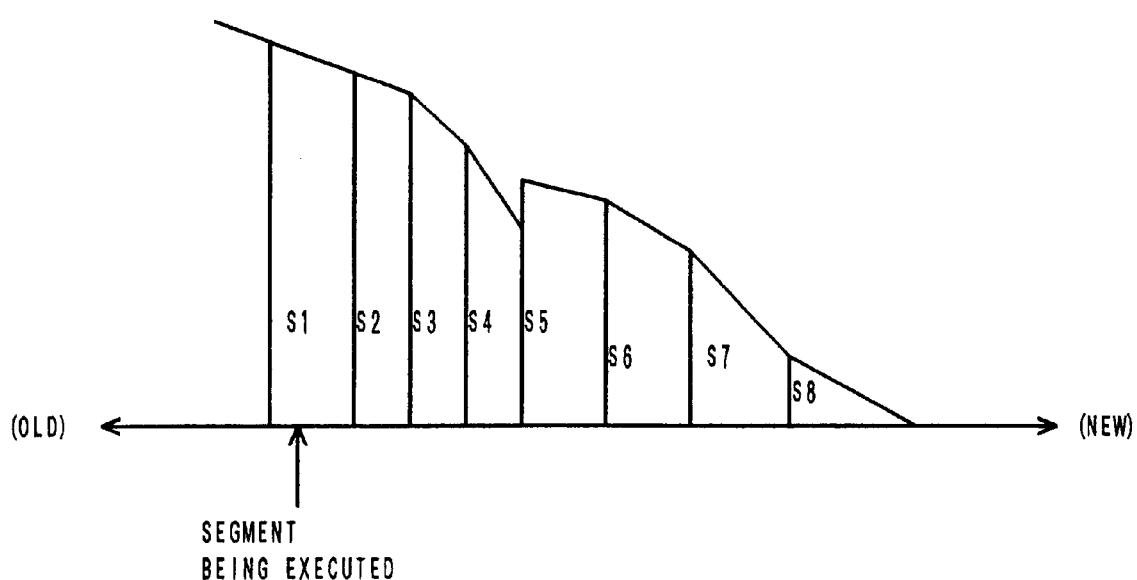
FIG. 5 is a schematic view for illustrating the acceleration/deceleration for a plurality of segments.

In FIG. 5, any of S1, S2 . . . S8 denotes a segment in the intermediate memory, which has been outputted from the first interpolation section. Of S1 to S8, S8 is the latest segment in the intermediate memory, and S1 is a segment being executed at present. In the explanation from this time on, the "segment being executed" means the latest segment on which the second interpolation processing by the second interpolation section has already been started. Generally, it also is the oldest segment in the intermediate memory (because the segment data on which the second interpolation processing has been completed are erased from the intermediate memory, and the second interpolation processing of the next segment is started immediately).

As one example, taking the end point velocity of the latest segment S8 in the intermediate memory as 0, and assuming that the end point velocity (here, 0 for S8) is reached as the result of deceleration at the optimal acceleration At(opt) determined for each segment, a velocity at the start point of the segment (first, the start point of segment S8) is determined. This velocity is taken as the velocity at the end point of the preceding segment (segment S7 for segment S8). Subsequently, while repeatedly determining the velocity at the start point of preceding segment similarly, a velocity pattern is prepared down to the segment being executed at present (the oldest segment in the intermediate memory).

During this process, when a velocity lower than the prepared velocity pattern is obtained by the condition such as corner deceleration and command velocity as at the end point of segment S4 in FIG. 5, a new velocity pattern is prepared from this velocity. The reason why the end point velocity of the latest segment in the intermediate memory is assumed to be 0 is that deceleration can always be achieved to 0 even if the first interpolation side stops. The velocity corresponding to the end point of each segment of the velocity pattern thus prepared is taken as the deceleration target velocity of each segment.

Although linear acceleration/deceleration has been explained in the above example, this algorithm is not limited to the linear type. For example, this algorithm can be applied to bell-shaped acceleration/deceleration with which for example, time-constant linear acceleration/deceleration is combined.

Figure 6:
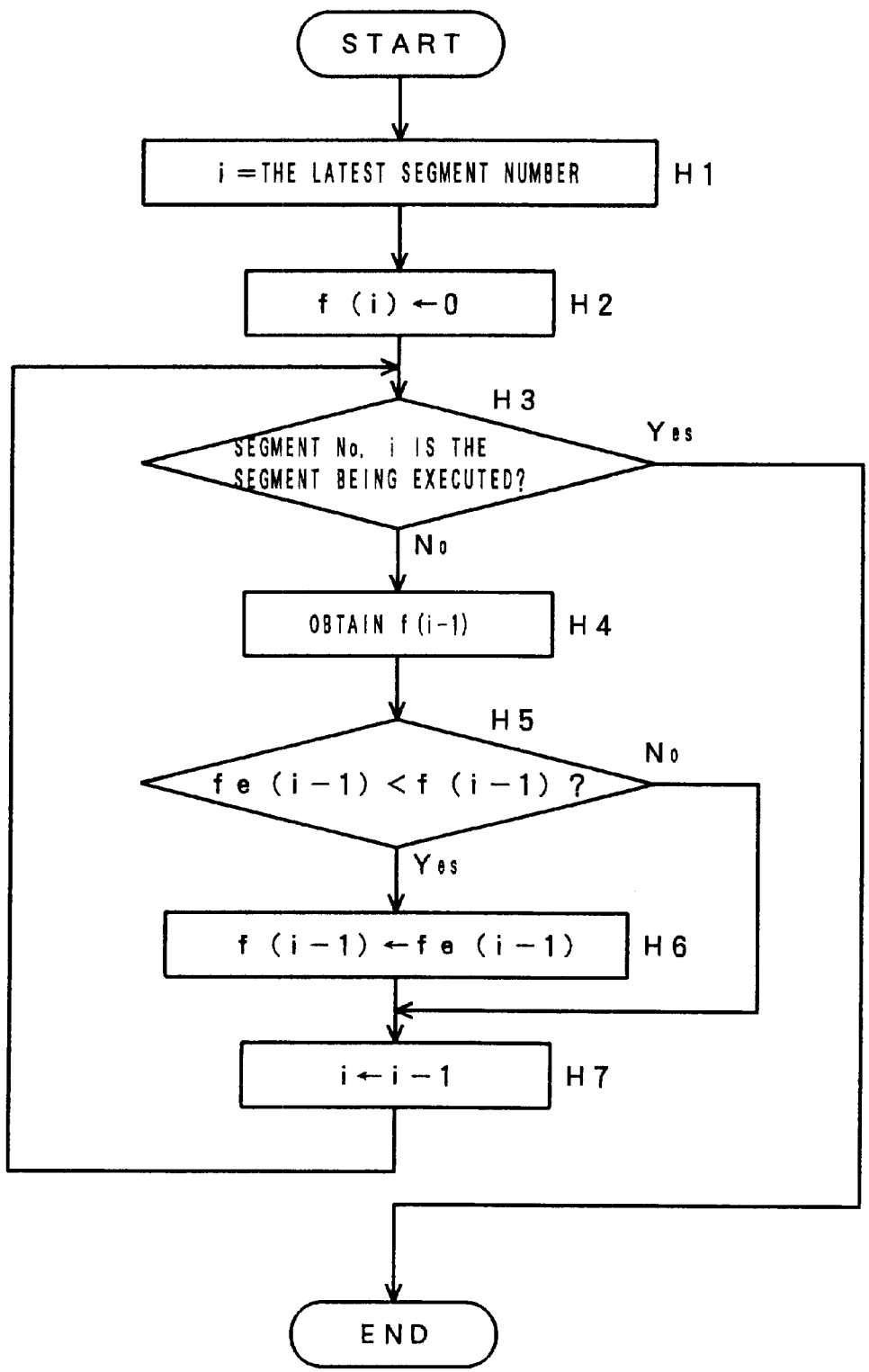
FIG. 6 is a flowchart describing the outline of algorithm in acceleration/deceleration processing for the plurality of segments.

FIG. 6 is a flowchart generally showing the aforementioned algorithm. Here, f(i) denotes a velocity at the end point of segment No. i. Also, fe(i) is a velocity determined by the condition such as corner deceleration for the end point of segment No. i. The points of Steps H1 to H7 are described below in due order.

Step H1: The number (segment No.) i of the latest segment in the intermediate memory is identified. In the example shown in FIG. 8, i=8. Hereinafter, i is handled as an index expressing the progress state of processing period (a register for storing index i has been set in advance).

Step H2: The velocity f(i) at the end point of segment No. i is defined as 0.

Step H3: It is judged whether or not segment i is the segment being executed. If the judgment result is Yes, the acceleration/deceleration pattern at this point of time is completed, thereby finishing the process. If the judgment result is No, the procedure proceeds to Step S4.

Step H4: The velocity at the start point of segment No. i is computed based on At(opt) having been determined for segment No. i, and is defined as the velocity f(i−1) at the end point of segment No. i−1. However, this f(i−1) is not a final value, and may be changed (downward correction) in the next step H5.

Step H5: The velocity f(i−1) determined in Step H4 is compared with the velocity fe(i−1) separately determined by any other condition such as corner deceleration for the end point of segment No. i−1. If fe(i−1)<f(i−1), the procedure proceeds to Step H6, and if fe(i−1)<f(i−1), the procedure proceeds to Step H7.

Step H6: The velocity f(i−1) determined in step H4 is changed to fe(i−1).

Step H7: Index i is counted down by 1.

Figure 7:
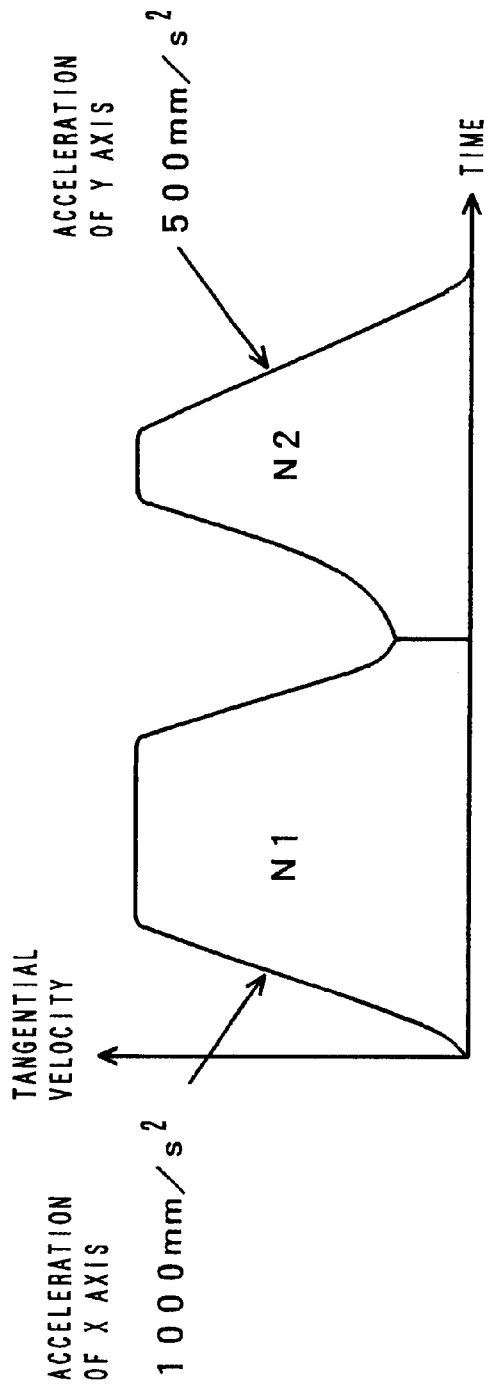
FIG. 7 is a schematic view showing a state of acceleration/deceleration in a case where the present invention is applied to a case where the settings of the allowable accelerations of X axis and Y axis are different.
Figure 8:
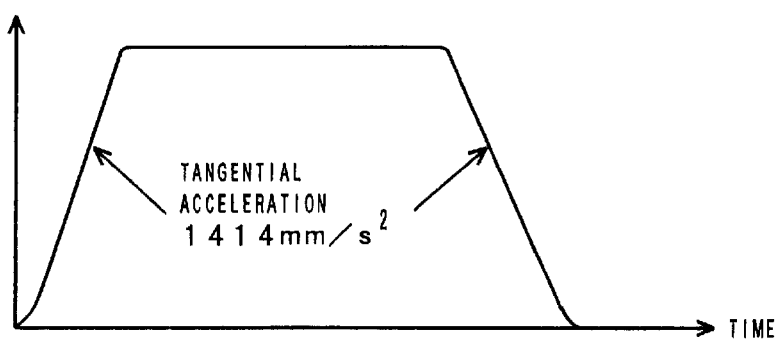
FIG. 8 is a schematic view showing a state of acceleration/deceleration in a case where the present invention is applied to a case where the settings of the allowable accelerations of X axis and Y axis are the same.

FIGS. 7 and 8 show examples of states of acceleration/deceleration in the case where the present invention is applied to two cases. First, FIG. 7 shows an example of state of acceleration/deceleration in the case where the present invention is applied to a case in which the settings of allowable accelerations of X axis and Y axis are different. The condition setting is as described below.

Allowable acceleration of X axis: 1000 mm/s$^2$

Allowable acceleration of Y axis: 500 mm/s$^2$

The program is made up of two blocks of N1 and N2. Block N1 is for the movement in the X-axis direction, and block N2 is for the command for movement in the Y-axis direction. The transfer from block N1 to block N2 is assumed to be effected smoothly (positioning ratio: less than 100%). The symbols G01 . . . and so on describing the program are typically shown for convenience.

As seen from this figure, in block N1, acceleration/deceleration is effected at 1000 m/s$^2$ because the movement is in the X-axis direction. On the other hand, in block N2, acceleration/deceleration is effected at 500 m/s$^2$ because the movement is in the Y-axis direction.

Next, FIG. 8 shows an example of state of acceleration/deceleration in the case where the present invention is applied to a case in which the settings of allowable accelerations of X axis and Y axis are the same. The condition setting is as described below.

Allowable acceleration of X axis: 1000 mm/s$^2$

Allowable acceleration of Y axis: 1000 Mm/S2

The program consists of one block of N1. Block N1 is for the command for movement in the direction of 45 degrees on the XY plane. The symbols G01 . . . and so on describing the program are typically shown for convenience.

As seen from this figure, the tangential velocity is 1414 mm/s$^2$ because both of X axis and Y axis operate for the movement in the direction of 45 degrees. At this time, the accelerations of X axis and Y axis are just 1000 mm/s$^2$ (allowable acceleration).

Figure 9:
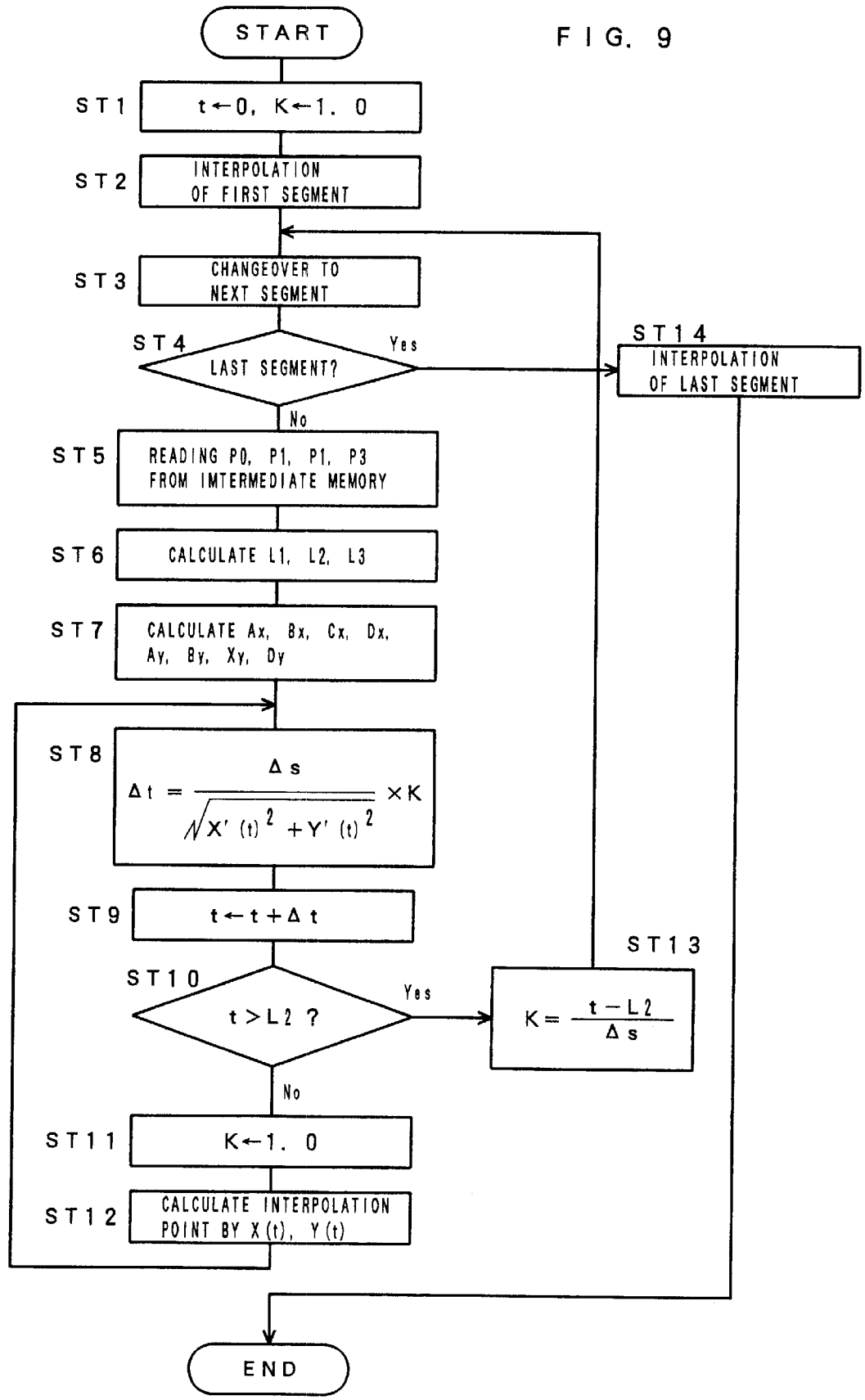
FIG. 9 is a flowchart for illustrating the generation of a smooth curve performed by a second interpolation section and the output of point on the smooth curve.

Finally, the generation of a smooth curve effected by the second interpolation section and the output of point on the smooth curve are described briefly. As described above, various methods can be used for the smooth interpolation effected in the second interpolation. Here, referring to the flowchart shown in FIG. 9, a method using a cubic expression passing through the first interpolation point is explained. Although computation is performed for only two axes of X and Y in this example, extension to arbitrary number of axes is possible. The segment described here means a curve interpolation portion between one first interpolation point and the next first interpolation point. Also, the symbols in the flowchart are defined as follows:

P0: the first interpolation point just before the start point of segment in which interpolation processing is now being executed P1: the start point of segment in which interpolation processing is now being executed P2: the end point of segment in which interpolation processing is now being executed P3: the first interpolation point just after the start point of segment in which interpolation processing is now being executed L1: the distance between P0 and P1

L2: the distance between P1 and P2

L3: the distance between P2 and P3

Δs: the tangential velocity outputted from the acceleration/deceleration processing section (motion amount in the second sampling period)

K: a coefficient representing the ratio of motion amount which is not outputted at the time of changeover of segment The coordinates of an interpolation point in a segment is computed by using the expressions described below. Assuming that the parameter t takes a value of −L1, 0, L2 and (L2+L3) at point P0, P1, P2 and P3, respectively, coefficients Ax, Bx, Cx, Dx, Ay, By, Cy and Dy are determined under the condition that the coordinate values of X(t) and Y(t) at that point of time coincide with the coordinate values of points P0 to P2. The second interpolation point in the segment can be obtained by changing t in the range of [0≦t≦L2] in the following expressions.

$$X(t)=Axt3+Bxt2+Cxt+Dx$$

$$Y(t)=Ayt3+Byt2+Cyt+Dy$$

Also, the values obtained by differentiating X(t) and Y(t) with respect to t are expressed by X'(t) and Y'(t). The point of processing in each step is as described below.

Step ST1: The parameter t and the coefficient K are initialized. Since K is a coefficient representing the ratio of motion amount which is not outputted at the time of changeover of segment, it is set at 1.0 except the time of changeover.

Step ST2: The interpolation of the first segment is performed. In the first segment, because the first interpolation point just before that segment is absent, an interpolation processing method different from the method described in Step ST3 and the subsequent steps in the flowchart is used. The interpolation processing method in such a case is well known, so that the explanation of the detailed procedure for the method is omitted.

Step ST3: The segment in which interpolation processing is to be executed is changed over to the next segment.

Step ST4: It is determined whether or not the segment which is subjected to the interpolation process is the last segment. If it is the last segment, the procedure proceeds to Step ST14 (interpolation processing of the last segment). If it is not the last segment, the procedure proceeds to Step ST5.

Steps ST5 to ST7: The coordinates of P0, P1, P2 and P3 are read from the intermediate memory, the distances L1, L2 and L3 of segment are determined, and the coefficients Ax, Bx, Cx, Dx, Ay, By, Cy and Dy for the expressions X(t) and Y(t) for performing interpolation are determined.

Step ST8: The motion amount Δs for the second sampling period computed in the acceleration/deceleration processing section, the first differential values of X(t) and Y(t), and the increment Δt of time t from K are determined.

Step ST9: The increment Δt is added to t.

Step ST10: The parameter t is compared with L2. When t>L2, judging that the changeover to the next segment is needed, the procedure proceeds to Step ST13 (computation of ratio K of distance to be outputted in the next segment). When t≦L2, judging that the process is in the same segment, the procedure proceeds to Step ST11.

Step ST11: The coefficient K is set at 1.0.

Step ST12: After the second interpolation point is computed based on X(t) and Y(t), the process returns to Step ST8.

Step ST13: The ratio K of distance to be outputted in the next segment is computed.

Step ST14: The interpolation processing of the last segment is performed. In the last segment, because the first interpolation point just after that segment is absent, as in the case of the first segment, an interpolation processing method different from the method described in Step ST3 and the subsequent steps in the flowchart is used. The interpolation processing method in such a case is well known, so that the explanation of the detailed procedure for the method is omitted.

Figure 10:
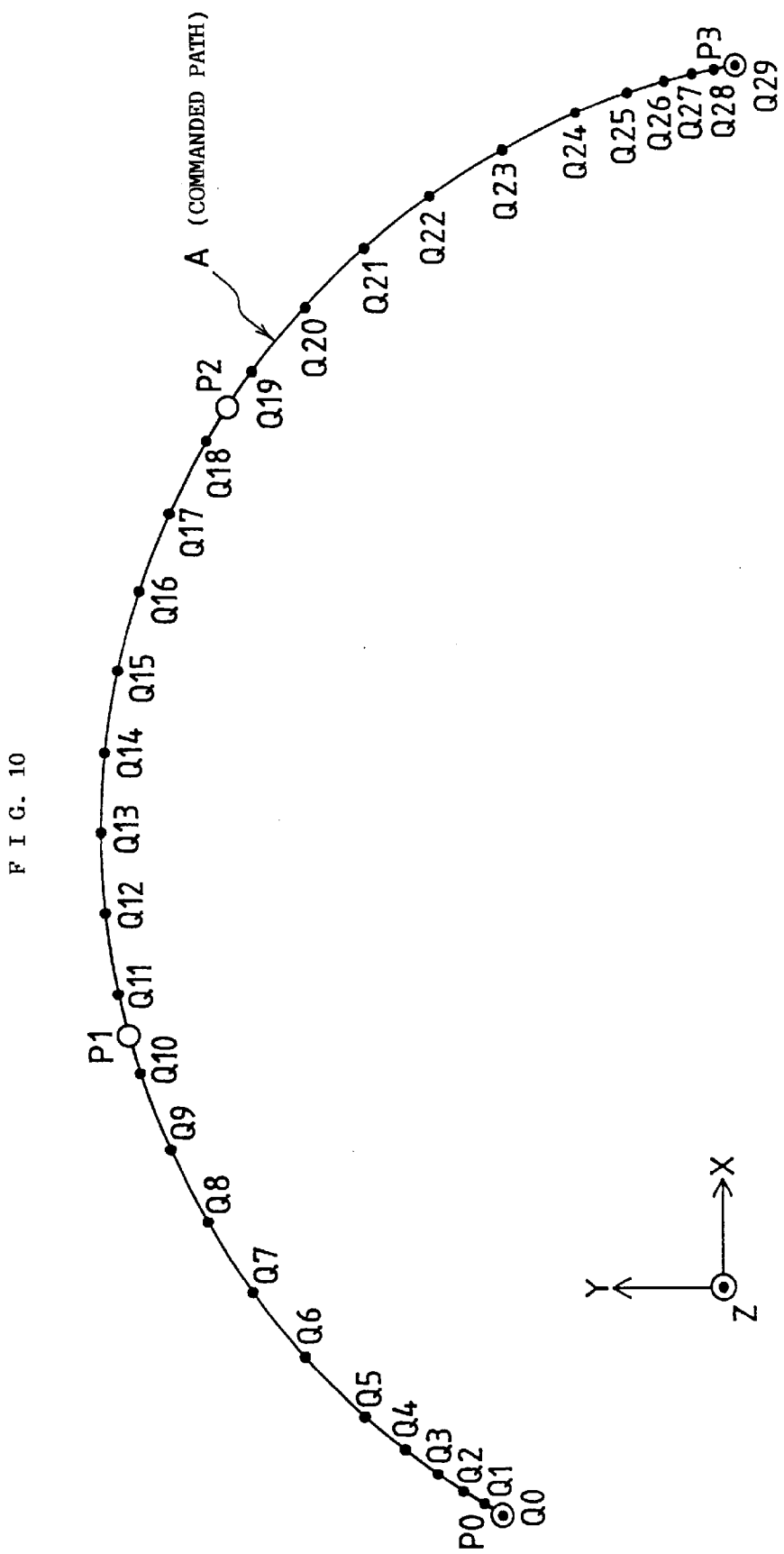
FIG. 10 is a schematic view typically showing a state of interpolation points after a second interpolation.

FIG. 10 typically shows a state of interpolation points after the second interpolation. In this figure, P1 to P3 are interpolation points outputted from the first interpolation section, and Q0 to Q29 are interpolation points outputted from the second interpolation section. As is apparent from this figure, by interpolating with a smooth curve (here, a quadratic curve), the actual movement path is made very close to the commanded path.

Although a case has been explained for simplicity in which interpolation is performed with a cubic expression passing through four first interpolation points, various curves such as a curve expressed by a polynomial of various degrees, a spline curve, a Beje curve, and a B spline curve can be used in addition to the abovementioned curve as a method for interpolating a curve. Since the methods themselves for interpolating these curves are well known in the art, the detailed explanation of individual method is omitted.

According to the present invention, in the controller for controlling a machine such as a general machine tool, a laser beam machine, and a plasma jet machine, acceleration/deceleration control in which the optimal tangential acceleration that does not exceed the allowable maximum acceleration at the time of acceleration/deceleration set for each axis is applied can be carried out while fully taking advantage of the acceleration capacity of each axis. In the present invention, the acceleration/deceleration control can also be applied to a case where the motion direction changes at every moment.

What is claimed is:

1. A controller for executing an interpolation on a motion path of a tool through a plurality of interpolations, including a first interpolation for obtaining an interpolation point at a first interpolation period and a second interpolation for interpolating interpolated points outputted from the first interpolation at a plurality of second interpolation periods so as to control a machine having a plurality of axes driven by servomotors, comprising:

a tangential acceleration calculating unit to obtain a tangential acceleration of a motion segment at the first interpolation sampling period based on allowable maximum acceleration predetermined for respective axes and direction of motion of the tool included in outputted data from the first interpolation; and an acceleration/deceleration processing unit to obtain a tangential velocity by performing tangential acceleration/deceleration processing over motion segments at corresponding second interpolation sampling periods based on the tangential acceleration;

wherein the second interpolation is performed based on the tangential velocity obtained by the acceleration/deceleration processing unit.

2. The controller of claim 1, further comprising a target velocity calculating unit to obtain a target velocity at an end of the motion segment at the first interpolation sampling period so as to perform tangential acceleration/deceleration processing over the motion segments at the corresponding second interpolation sampling periods.

3. The controller of claim 1, wherein the second interpolation includes determining final interpolation points on a smooth curve based on output data of the acceleration/deceleration processing unit and output data of the first interpolation.

4. The controller of claim 1, further comprising a target velocity calculating unit, which:

assigns an index i to indicate a newest motion segment outputted from the first interpolation and sets a velocity at an end point of the motion segment i to zero;

calculates a velocity at a start point of the motion segment i so as to reach the velocity at an end point of the motion segment i based on tangential acceleration;

sets the velocity at the start point as a velocity of an end point of a motion segment i–1 which is immediately before the motion segment i;

determines whether the motion segment i–1 is subjected to the second interpolation, and if it is determined that the motion segment i–1 is not subjected to the second interpolation then the index i is decreased by one and the assigning of the decreased index i to indicate the newest motion segment, the calculating of the velocity at the start point, the setting the velocity at the start point as the velocity at the end point, and the determining of second interpolation subjection is repeated.

5. The controller of claim 4, wherein the calculating of the velocity start point is a downward correction.

6. A machine control method, executing an interpolation on a motion path of a tool through a plurality of interpolations, including a first interpolation obtaining an interpolation point at a first interpolation period and a second interpolation interpolating interpolated points outputted from the first interpolation at a plurality of second interpolation periods so as to control a machine having a plurality of axes driven by servomotors, comprising:

obtaining a tangential acceleration of a motion segment at the first interpolation sampling period based on allowable maximum acceleration predetermined for respective axes and direction of motion of the tool included in outputted data from the first interpolation;

calculating target velocity by assigning an index i to indicate a newest motion segment outputted from the first interpolation and setting a velocity at an end point of the motion segment i to zero, calculating a velocity at a start point of the motion segment i so as to reach the velocity at an end point of the motion segment i based on tangential acceleration, setting the velocity at the start point as a velocity of an end point of a motion segment i–1 which is immediately before the motion segment i, determining whether the motion segment i–1 is subjected to the second interpolation, and if it is determined that the motion segment i–1 is not subjected to the second interpolation then decreasing the index i by one and repeating the assigning of the decreased index i to indicate the newest motion segment, the calculating of the velocity at the start point, the setting the velocity at the start point as the velocity at the end point, and the determining of second interpolation subjection; and obtaining a tangential velocity by performing tangential acceleration/deceleration processing over motion segments at corresponding second interpolation sampling periods based on tangential acceleration and the calculated target velocity, wherein the second interpolation is performed based on the obtained tangential velocity.

7. A machine control method, comprising:

a tangential acceleration calculating unit to obtain a tangential acceleration of a motion segment at a first interpolation sampling period based on allowable maximum acceleration predetermined data outputted from a first interpolation unit;

an acceleration/deceleration processing unit to obtain a tangential velocity by performing tangential acceleration/deceleration processing over motion segments at corresponding second interpolation sampling periods based on the tangential acceleration, wherein a second interpolation is performed based on the tangential velocity obtained by the acceleration/deceleration processing unit; and controlling a motion path of a tool for a machine based on the output of the second interpolation.

* * * * *

UNITED STATES PATENT AND TRADEMARK OFFICE
CERTIFICATE OF CORRECTION

PATENT NO.    : 6,539,275 B1
DATED         : March 25, 2003
INVENTOR(S)   : Toru Mizuno et al.

It is certified that error appears in the above-identified patent and that said Letters Patent is hereby corrected as shown below:

Column 6,
Line 20, after "used" begin new paragraph.

Column 7,
Lines 5, 11, 25 and 39, "d cos" should be -- dcos --;
Line 15, "d cos" (both occurrences) should be -- dcos --;
Lines 30 through 35, after "In the above example," "d cos" (all three occurrences) should be -- dcos --;
Line 47, "At(opt) should be -- At (opt) --;

Column 8,
Lines 9 and 54, "At(opt) should be -- At (opt) --;
Line 63, "< " should be -- ≥ --.

Signed and Sealed this

Tenth Day of June, 2003

JAMES E. ROGAN
*Director of the United States Patent and Trademark Office*